(12) United States Patent
Ferrand

(10) Patent No.: US 7,241,482 B2
(45) Date of Patent: Jul. 10, 2007

(54) PROTECTIVE SHEATH RECLOSABLE BY OVERLAPPING AND USE THEREOF

(75) Inventor: Jean Ferrand, Crepy-en-Valois (FR)

(73) Assignee: Federal Mogul Systems Protection Group, Crepy-en-Valois (FR)

( * ) Notice: Subject to any disclaimer, the term of this patent is extended or adjusted under 35 U.S.C. 154(b) by 75 days.

(21) Appl. No.: 10/498,997

(22) PCT Filed: Dec. 3, 2002

(86) PCT No.: PCT/FR02/04147

§ 371 (c)(1),
(2), (4) Date: Jun. 18, 2004

(87) PCT Pub. No.: WO03/054438

PCT Pub. Date: Jul. 3, 2003

(65) Prior Publication Data

US 2005/0069666 A1   Mar. 31, 2005

(30) Foreign Application Priority Data

Dec. 18, 2001   (FR) .................................. 01 16376

(51) Int. Cl.
*B32B 1/08* (2006.01)
*B32B 9/00* (2006.01)
*B32B 7/12* (2006.01)
*F16L 11/00* (2006.01)
*F16L 9/00* (2006.01)

(52) U.S. Cl. ................... 428/40.1; 428/34.1; 428/34.2; 428/347; 138/110; 138/128; 138/169

(58) Field of Classification Search .............. 428/40.1, 428/347, 34.1, 34.2; 138/123, 110, 128, 138/169
See application file for complete search history.

(56) References Cited

U.S. PATENT DOCUMENTS

| 4,513,173 A | * | 4/1985 | Merry ..................... 174/121 A |
| 5,123,453 A | | 6/1992 | Robbins |
| 6,048,224 A | * | 4/2000 | Kay .......................... 439/445 |
| 6,375,610 B2 | * | 4/2002 | Verschuur ................... 600/122 |
| 6,573,419 B2 | * | 6/2003 | Naimer ........................ 602/41 |

FOREIGN PATENT DOCUMENTS

| DE | 295 10 907 | 11/1995 |
| EP | 0 299 626 | 1/1989 |
| EP | 0 779 466 | 6/1997 |
| FR | 2 745 962 | 9/1997 |
| WO | WO 00 46543 | 8/2000 |

OTHER PUBLICATIONS

Markel Corporation, "Sample Card Abrasion/Sound Dampening Sleeving Products" 1999.
Markel Corporation, "Polyester Wrap Sleevings" 2000.

* cited by examiner

*Primary Examiner*—Bruce H. Hess
*Assistant Examiner*—Lawrence D. Ferguson
(74) *Attorney, Agent, or Firm*—Young & Thompson

(57) ABSTRACT

The invention concerns a protective sheath reclosable by overlapping comprising an outer longitudinal edge (10*a*) adapted to overlap an inner longitudinal edge (10*b*) of the sheath (10) in an overlap portion (13). Adhesive means (11) are fixed on an inner surface of the outer longitudinal edge (10*a*), the adhesive means (11) extending over a portion of the inner surface of the sheath (10) adapted to extend beyond the overlap portion (13). Said reclosable protective sheath is useful in particular for protecting at least an elongated object (15).

15 Claims, 2 Drawing Sheets

PROTECTIVE SHEATH RECLOSABLE BY OVERLAPPING AND USE THEREOF

BACKGROUND OF THE INVENTION

The present invention relates to a protective sheath recloseable by overlapping.

Using recloseable sheaths to protect elongate members, such as bundles of electrical cables, control cables or pipes or hoses, routinely used in automobile vehicles, is known in the art.

The purpose of these sheaths is to protect the elongate members from the external environment mechanically and sometimes acoustically.

They are additionally used to hold these elongate members together, in particular in the case of bundles of electrical cables or control cables.

To facilitate fitting a protective sheath to an elongate member, a substantially tubular sheath is used, slit longitudinally, so that it can be opened up and then reclosed after positioning it along the length of an elongate member.

This sheath is a textile sheath, for example, of the woven or braided polyester type. It may be conformed so that, when unstressed, it takes the form of a tubular sheath closed by virtue of an overlapping portion in which the two longitudinal edges of the sheath are superposed. A sheath of this kind is referred to as self-closeable.

However, although this sheath is self-closeable, it is sometimes necessary, in order to ensure that the sheath actually remains properly closed, to tape it at a regular distance along its length, for example with adhesive tape, or to position fixing clips along its length.

Furthermore, it is necessary to prevent movement of these sheaths in translation along the elongate member, and in particular along straight sections of this elongate member.

In this case a portion of adhesive tape is frequently placed at each end of the sheath so that the adhesive overlaps the sheath and the elongate member that it protects.

SUMMARY OF THE INVENTION

An object of the present invention is to solve the problems previously cited and to propose a protective sheath recloseable by overlapping that may be simultaneously closed and held in place on an elongate member without requiring the operator to perform a large number of accessory interventions.

To this end, the present invention is directed to a protective sheath recloseable by overlapping, an exterior longitudinal edge being adapted to overlap an interior longitudinal edge of the sheath in an overlapping portion.

According to the invention, this protective sheath comprises adhesive means fixed to an internal face of the exterior longitudinal edge, said adhesive means extending over an internal face portion of the sheath adapted to extend beyond the overlapping portion.

Thus, by virtue of the presence of adhesive means on the internal face of the sheath, it is possible simultaneously to close the sheath in the overlapping portion, by virtue of the adhesive present between the exterior longitudinal edge and the interior longitudinal edge of the overlapping portion, and to fix this sheath to the members that it protects, by virtue of a portion of the adhesive means that extends beyond the overlapping portion and therefore faces the members that it protects.

When fitting this protective sheath, this achieves reliable closure of this sheath, even in the portions where it is highly stressed, and in particular in curved portions.

Furthermore, movement of this sheath in translation along an elongate member that it protects is prevented by the presence of adhesives beyond the overlapping portion.

According to a preferred feature of the invention, the adhesive means extend over an internal face portion of width from ¼ to half the width of said sheath.

By virtue of the presence of the adhesive means over a great width of the internal face of the sheath, it is possible at the same time to close the sheath and to fix it to the elongate member, regardless of the diameter of this elongate member, and consequently regardless of the width of the overlapping portion of the longitudinal edges of the sheath.

These adhesive means preferably extend over an internal face portion of width substantially equal to ⅓ the width of the sheath.

A second aspect of the present invention is directed to the use of a recloseable protective sheath as previously described to protect at least one elongate member and in particular a bundle of cables or a pipe.

According to the invention, in such use, the adhesive means are adapted firstly to fasten the exterior longitudinal edge to the interior longitudinal edge of the overlapping portion of the sheath and secondly to fix said sheath to the elongate member.

Mounting this recloseable sheath on an elongate member, and in particular on components of an automobile vehicle, is greatly facilitated and does not require the use of accessories to hold this sheath in position, such as an adhesive tape or various mounting clips.

Other features and advantages of the invention will become more apparent in the course of the following description.

BRIEF DESCRIPTION OF THE DRAWINGS

In the appended drawings, which are provided by way of nonlimiting example.

DESCRIPTION OF THE PREFERRED EMBODIMENTS

A first embodiment of a protective sheath recloseable by overlapping will be described first of all with reference to FIGS. 1 to 3.

Here, this protective sheath 10 is self-closeable, i.e. when unstressed (with no external load), it takes the form of a tubular sheath slit longitudinally.

Here, this protective sheath 10 is woven from polyester filaments.

Of course, other materials may be used, such as glass fibers. The filaments may be monofilaments or multifilaments, or a mixture of the latter. The structure may be obtained by weaving, braiding, knitting, etc.

Figure 2:
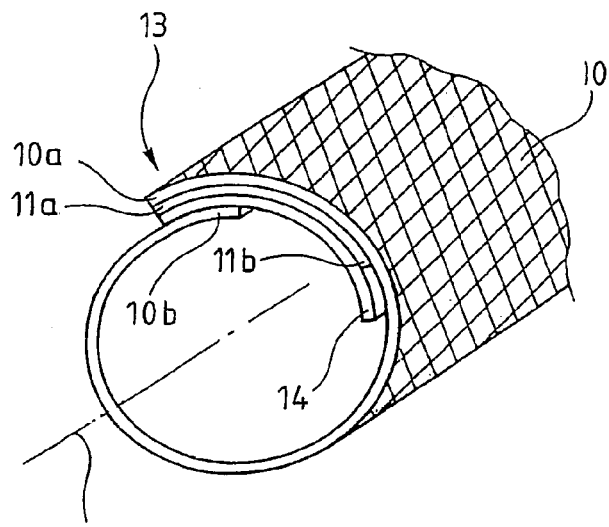
FIG. 2 is a perspective view of the sheath from FIG. 1 in a self-closed position.

As shown clearly in FIG. 2, this self-closeable protective sheath is closed along its longitudinal axis X so that the longitudinal edges of the sheath overlap each other.

As shown clearly in FIG. 2, an exterior longitudinal edge 10a is adapted to overlap an interior longitudinal edge 10b when the protective sheath is in its self-closed position.

The protective sheath may assume its self-closed position when unstressed if the woven structure is produced in tubular form or if a thermoforming operation has been applied to a plane textile strip to conform it to a tubular shape.

Adhesive means 11 are fixed to an internal face 12 of the sheath.

Here, these adhesive means 11 consist of an adhesive tape that extends in the longitudinal direction X of the sheath. They are disposed on an internal face 12, at the level of the exterior longitudinal edge 10a. This adhesive tape 11 preferably extends in the vicinity of the free edge 10'a of the exterior longitudinal edge 10a of the overlapping portion 13 of the sheath.

Although this adhesive tape 11 is shown as extending continuously along the longitudinal edge 10a of the sheath 10, the adhesive means could equally consist of different portions of tape aligned in the longitudinal direction X of the sheath along the exterior longitudinal edge 10a.

Figure 1:
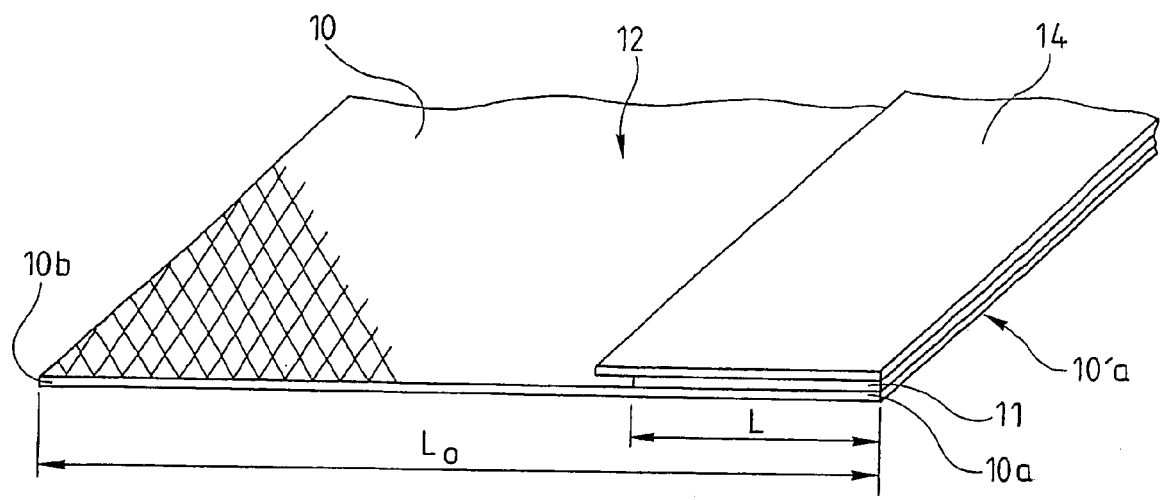
FIG. 1 is a perspective view of a protective sheath conforming to a first embodiment of the invention, the protective sheath being held in an open position.

As shown clearly in FIG. 1, in which the protective sheath is shown held open, this adhesive strip extends over an internal face portion 12 whose width L is from ¼ to half the width $L_0$ of the sheath 10. This adhesive tape 11 preferably extends over an internal face portion 12 of width L equal to ⅓ the width $L_0$ of the sheath 10.

Here, this adhesive tape consists of a double-sided adhesive. A first adhesive side of the tape 11 is fixed to the internal face 12 of the exterior longitudinal edge 10a of the overlapping portion 13 and a second adhesive side is covered with a detachable protective film 14.

This detachable protective tape 14 prevents the adhesive tape sticking to portions of the sheath before fitting the latter. To facilitate removing this protective film 14 when fitting the sheath to a member to be protected the detachable protective film 14 projects slightly beyond the adhesive tape 11 itself, in a manner that is known in the art.

Figure 3:
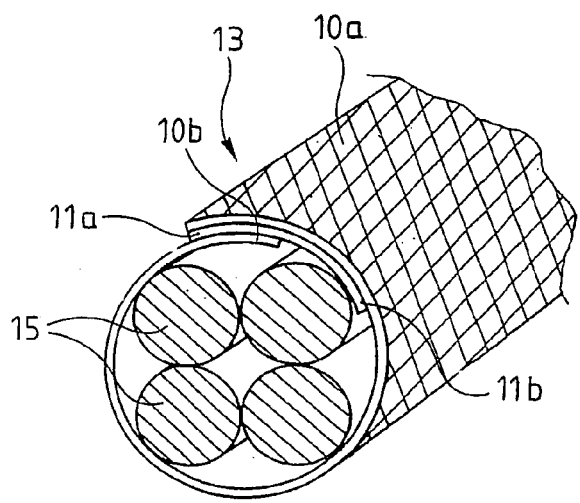
FIG. 3 is a view analogous to FIG. 2 in which the protective sheath is mounted on a cable bundle.

As shown clearly in FIGS. 2 and 3, this adhesive tape has a width L such that in the closed position of the sheath it comprises a first portion 11a that extends inside the overlapping portion 13 of the sheath and a second portion 11b that extends beyond this overlapping portion 13.

As shown in FIG. 3, if this sheath is used to protect a bundle of cables 15, for example, after removing the protective film 14 the first portion 11a of the adhesive tape fixes together the exterior and interior longitudinal edges 10a, 10b of the sheath inside the overlapping portion 13.

At the same time, the second portion 11b of the adhesive tape 11 fastens the sheath to a portion of the bundle of cables 15 so that any movement of this sheath 10 in translation along the bundle of cables 15 may be carefully prevented.

Figure 4:
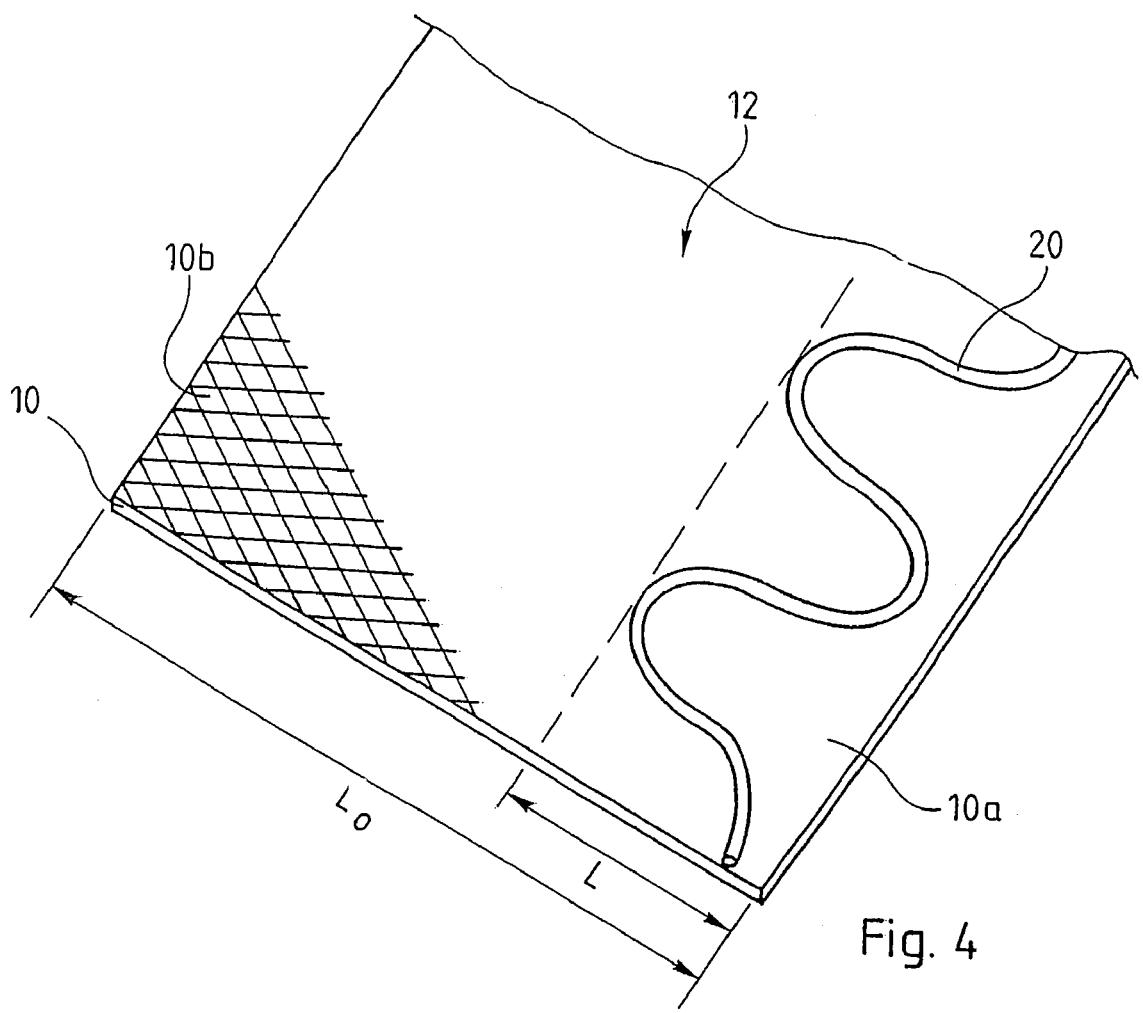
FIG. 4 is a perspective view of a protective sheath conforming to a second embodiment of the invention, the protective sheath being held in an open position.

A second embodiment of the present invention will be described now with reference to FIGS. 4 and 5.

Once again, it is a question here of a sheath 10 as previously described that is self-closeable by overlapping so that an exterior longitudinal edge 10a is adapted to overlap the interior longitudinal edge 10b.

Here, the adhesive means consist of an adhesive bead 20 disposed along a sinusoidal curve in the longitudinal direction X of the sheath 10.

They also occupy a portion of the internal face 12 of the tape whose width L is from ¼ to half the width $L_0$ of the sheath and preferably equal to about ⅓ that width $L_0$ of the sheath 10.

By virtue of this sinusoidal disposition of the adhesive, the latter comprises first curve portions 20a inside the overlapping portion 13 of the sheath and second curve portions 20b that extend beyond the overlapping portion 13.

Here, these adhesive means consist of an adhesive activated by heat, such as a hot melt adhesive. Sticking by the adhesive is therefore obtained by heating this sheath portion after it is mounted around the element to be protected.

Figure 5:
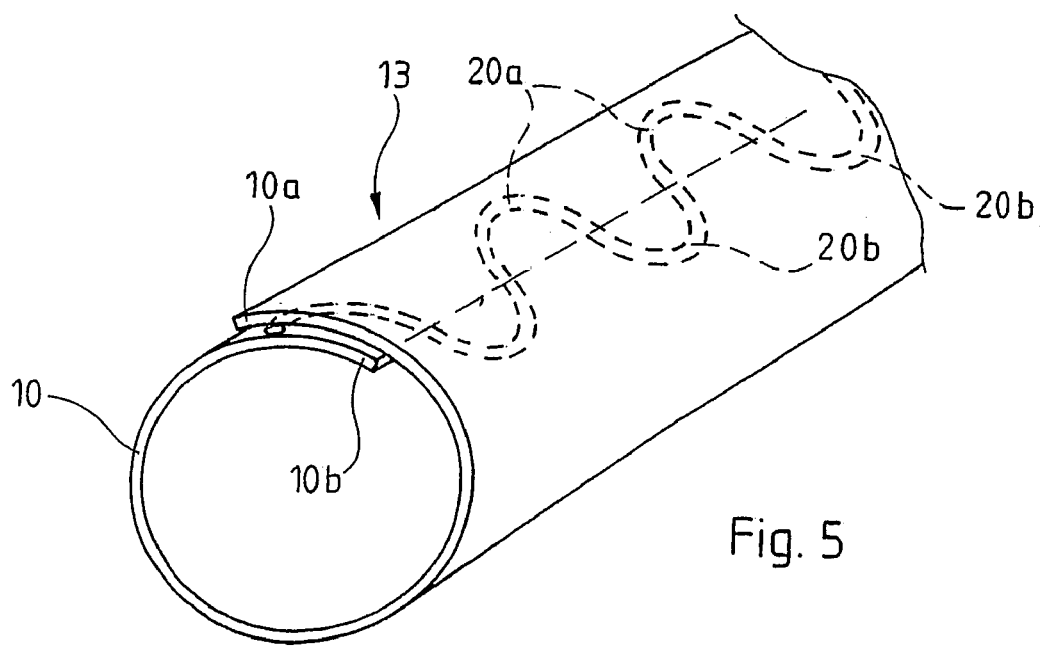
FIG. 5 is a perspective view of the protective sheath from FIG. 4 in a self-closed position.

As shown clearly in FIG. 5, the first sinusoidal curve portions 20a fix the exterior longitudinal edge 10a to the interior longitudinal edge 10b of the sheath 10 in order to close this sheath even if it is highly stressed.

The second sinusoidal curve portions 20b fix the sheath 10 to an elongate member that it protects, such as a bundle of cables 15 shown in FIG. 3.

This produces a protective sheath whose fitting and use do not require the use of accessories to close it and to hold it in position on a bundle of cables to be protected.

By virtue of the judicious disposition of the adhesive means, certain closure of the sheath and its retention in place are obtained at the same time.

Of course, many modifications may be made to the embodiments described hereinabove without departing from the scope of the invention.

In particular, the use of this recloseable protective sheath is not limited to the protection of bundles of cables or hoses, and it may be used to protect any type of elongate members.

Moreover, the double-sided adhesive tape 11 previously described could equally be replaced by a tape made from a heat-activated adhesive such as a hot melt adhesive.

Moreover, the adhesive means may occupy a different width of the internal face 12 of the sheath 10, up to the whole of the internal face 12 of the sheath.

Moreover, the adhesive means may comprise a plurality of adhesive portions distributed over the internal face 12 of the sheath in the vicinity of the exterior longitudinal edge 10a of the sheath 10.

Finally, although the examples just described relate to a self-closeable sheath, the invention equally concerns any type of sheath recloseable by overlapping.

The invention claimed is:

1. Protective sheath recloseable by overlapping, comprising an exterior longitudinal edge (10a) that overlaps an interior longitudinal edge (10b) of said sheath (10) in an overlapping portion (13), and adhesive means (11, 20) fixed to an internal face (12) of said exterior longitudinal edge (10a), said adhesive means (11, 20) extending over an internal face portion (12) of the sheath (10) beyond said overlapping portion (13).

2. Recloseable protective sheath according to claim 1, characterized in that the adhesive means (11, 20) extend over an internal face portion (12) of width (L) from ¼ to half the width ($L_0$) of said sheath (10).

3. Recloseable protective sheath according to claim 1, characterized in that said adhesive means (11, 20) extend over an internal face portion (12) of width (L) substantially equal to ⅓ the width ($L_0$) of said sheath (10).

4. Recloseable protective sheath according to claim 1, characterized in that the adhesive means (11, 20) consist of a doublesided adhesive.

5. Recloseable protective sheath according to claim 1, characterized in that the adhesive means (11, 20) are heatactivated.

6. Recloseable protective sheath according to claim 1, characterized in that the adhesive means consist of an adhesive tape (11) extending in the longitudinal direction (X) of the sheath (10) in the vicinity of the free edge (10'a) of the exterior longitudinal edge (10a) of the overlapping portion (13).

7. Recloseable protective sheath according to claim 6, characterized in that the adhesive tape (11) has a first adhesive side fixed to the internal face (12) of the exterior longitudinal edge (10a) of the overlapping portion (13) and a second adhesive side covered with a detachable protective film (14).

8. Recloseable protective sheath according to claim 1, characterized in that the adhesive means consist of an adhesive bead (20) disposed along a sinusoidal curve in the longitudinal direction (X) of the sheath (10).

9. Use of a recloseable protective sheath (10) according to claim 1 to protect at least one elongate member (15) and in particular a bundle of cables or a pipe, characterized in that said adhesive means (11, 20) are adapted firstly to fasten said exterior longitudinal edge (10a) to said interior longitudinal edge (10b) of the overlapping portion (13) of the sheath (10) and secondly to fix said sheath (10) to the elongate member (15).

10. Recloseable protective sheath according to claim 1, wherein said exterior longitudinal edge (10a) is directly adhered to said interior longitudinal edge (10b) in said overlapping portion (13) by said adhesive means (11, 20).

11. A recloseable protective sheath for protecting an elongate member, the protective sheath comprising:

a generally cylindrical cover having a longitudinal slit and an internal surface, said slit defining one longitudinal edge section of said cover and an opposite longitudinal edge section of said cover, said one longitudinal edge section overlapping said opposite longitudinal edge section in an overlapping portion that extends less than entirely around said internal surface; and an adhesive fixed to said internal surface of said one longitudinal edge section in said overlapping portion, said adhesive also being fixed to a portion of said internal surface extending continuously circumferentially beyond said overlapping portion to provide an adhesive face on said internal surface outside said overlapping portion that is adapted to adhere to an elongate member that is to be protected by the sheath, said adhesive face having a circumferential extent that is at least about as large as a circumferential extent of said overlapping portion.

12. The protective sheath of claim 11, further comprising a detachable protective film on said adhesive in said overlapping portion and on said adhesive face.

13. The protective sheath of claim 11, wherein said adhesive is one of a double-sided tape, a heatactivated adhesive, and a bead of adhesive laid out in a sinusoidal pattern.

14. The protective sheath of claim 11, wherein said adhesive extends around an entirety of a circumference of said internal surface so that said adhesive face overlaps said overlapping portion.

15. The protective sheath of claim 11, wherein said one longitudinal edge section is directly adhered to said opposite longitudinal edge section in said overlapping portion by said adhesive.

* * * * *